United States Patent Office 2,742,479
Patented Apr. 17, 1956

2,742,479

HALOGENATION OF PYRIDINES

Abraham Bavley, Brooklyn, and Morton Harfenist, Flushing, N. Y., assignors to Chas. Pfizer & Co., Inc., Brooklyn, N. Y., a corporation of Delaware No Drawing. Application April 18, 1952,
Serial No. 283,138

4 Claims. (Cl. 260—295)

This invention relates to the halogenation of pyridines, and more particularly, to an improved process for halogenating a 2,6-dihydroxypyridine in the 2,6 positions by treatment thereof with phosphorus oxychloride or phosphorus oxybromide to replace the hydroxyl groups with halogen.

It is well known that ordinary hydroxypyridines or pyridones can be halogenated readily under mild conditions of temperature and pressure, but that considerable difficulty is had with the halogenation of 2,6-dihydroxypyridines. In fact, the halogenation of 2,6-dihydroxypyridines has heretofore been accomplished under rather drastic conditions of temperature and pressure in closed systems. For example, 2,6 - dihydroxypyridine - 4 - carboxylic acid, also known as citrazinic acid, has been chlorinated by treatment with phosphorus oxychloride at a temperature of about 190 to 200° C. in a closed vessel wherein pressures in the order of 650 pounds per square inch, and greater, are generated by the evolution of a large quantity of acidic and highly corrosive vapors, mainly hydrogen chloride. However, the reaction is quite impractical for commercial purposes in view of the equipment requirements to meet the high pressures, temperatures and corrosive influences involved.

It is taught by the prior art that the hydrogen chloride evolved during this reaction is due to a side reaction occurring after chlorination of the pyridine ring by replacement of the hydroxyl groups with chlorine. This side reaction is stated to be the reaction of orthophosphoric acid, or a similar compound, with phosphorus oxychloride to give metaphosphoric acid and hydrogen chloride, a reaction known to occur at the temperature employed. For example, see Rabe, P., J. prakt. Chem., vol. 151, p. 71. However, it has now been found that hydrogen chloride is in fact evolved before any appreciable chlorination of the pyridine ring occurs. Indeed, as much as 2 to 3 mols of hydrogen halide per mol of the pyridine compound are evolved under atmospheric pressure at temperatures on only 90 to 110° C., indicating the formation of an intermediate compound by a condensation between the phosphorus oxyhalide and the hydroxyl groups in the 2 and/or 6 positions. Consequently, it is possible to remove the hydrogen halide gas, which is responsible for the major portion of the pressure buildup, before driving the reaction to completion at a more elevated temperature, thereby avoiding the high pressures heretofore employed.

Thus, in accordance with this invention 2,6-dihydroxypyridine compounds are effectively chlorinated by preheating the same with phosphorus oxychloride or phosphorus oxybromide and simultaneously withdrawing from the system the hydrogen halide gas evolved thereby, until a major amount of the hydrogen halide liberated during the reaction has been withdrawn, and then further heating the reaction mixture in a sealed vessel, under autogenously produced pressure and at a more elevated temperature, until the reaction is complete.

A variety of 2,6-dihydroxypyridines can be halogenated in accordance with this invention, including compounds which conform to the following general formula:

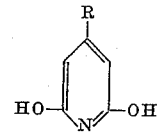

wherein R is hydrogen, alkyl, aryl, halogen or carboxyl. Illustrative examples of such compounds are 2,6-dihydroxypyridine; 2,6-dihydroxy-4-methyl pyridine; 2,6-dihydroxy-4-ethyl pyridine; 2,6-dihydroxy-4-chloropyridine; 2,6-dihydroxy-4-phenyl pyridine; and 2,6-dihydroxypyridine-4-carboxylic acid, or citrazinic acid. It is understood, however, that the above 2,6-dihydroxy pyridines can exist in a variety of tautomeric forms, such as the keto and enol forms, all of which are referred to herein simply as "dihydroxy pyridines" for the sake of convenience. This invention will be described in more detail with particular reference to the halogenation of citrazinic acid.

The citrazinic acid is mixed with the phosphorus oxyhalide in an amount of about 2 to 4 mols, preferably 3 mols, of phosphorus oxyhalide per mol of citrazinic acid. The preferred halogenating agent is phosphorus oxychloride. The mixing can be done before or during the preheating, which is preferably conducted at about atmospheric pressure and at a temperature from about 80° to 125° C. or up to the boiling point of the particular mixture employed. It is advantageous to reflux the mixture during the preheating, although the desired result can also be accomplished by heating below the boiling point within the range specified. Alternatively, the phosphorus oxyhalide can be removed by boiling, and continuously replaced with fresh and/or recycle oxyhalide. However, it is convenient to conduct the preheating in a vessel equipped with a reflux condenser and stirring means to keep the mixture under constant agitation, so that refluxing can be carried out.

The phosphorus oxychloride acts as a solvent for the citrazinic acid, which goes into solution with heating to give a thick brown appearance, accompanied by some foaming. The temperature of the reaction mixture is slowly raised to the reflux temperature, whereupon a large quantity of hydrogen chloride gas is evolved and carried off from the system. In general, the hydrogen chloride gas is evolved in an amount of about 2 to 3 mols per mol of citrazinic acid, depending upon the duration of the reflux period. Thus, a major amount of the hydrogen chloride liberated is removed from the system by refluxing until the foaming is followed by more normal boiling and the gas evolved is nearly all phosphorus oxychloride, which condenses and pours back through the reflux condenser. Usually, a reflux period of from about 1 to 4 hours is sufficient for this purpose.

After a major amount of the hydrogen chloride gas has been removed from the reaction mixture, the reaction vessel is sealed and the reaction mixture heated with slow stirring to about 180° C. to 230° C., preferably 200° C., at which temperature it is maintained for about 2 to 5 hours until the reaction is complete. The pressure will rise initially to about 100 to 150 pounds per square inch and then slowly fall during the course of the reaction.

Upon completion of the reaction, the reaction mass is cooled, preferably to a viscous liquid suitable for pouring. Excessive cooling may result in a crystallized product which is not as readily handled. At this point, the dichlorocitrazinic acid is in the form of its acid chloride, which can be hydrolyzed in water to 2,6-dichloropyridine-4-carboxylic acid, or separated as such from the reaction mixture by distillation of the excess phosphorus oxychloride therefrom. If the latter procedure is employed, the acid chloride can conveniently be reacted with an alkanol such as methanol, ethanol and the like to form the corresponding esters, or it can be reacted with other substances, if desired, by methods well known in the art.

The hydrolysis is effected by slowly pouring the reaction mass into water maintained preferably at a temperature of about 60° to 100° C. while stirring the same. Crystallization of the 2,6-dichloropyridine-4-carboxylic acid begins as soon as the acid chloride becomes hydrolyzed, at which time the excess phosphorus oxychloride is also hydrolyzed to form phosphoric acid and hydrochloric acid which remain in solution. After all of the reaction mass has been hydrolyzed, the mixture is cooled to a temperature sufficient to complete the crystallization of the dichloropyridine carboxylic acid. The crystalline product so obtained is then removed from the solution by filtration and washed with cool water, after which it is dried in air. Alternatively, the dichloropyridine carboxylic acid can be extracted from the acidic mixture with suitable water-immiscible solvents, such as chloroform, methyl isobutyl ketone, and the like.

The same procedure can be employed for the preparation of 2,6-dihalopyridine, or alkyl, aryl and halogen substituted 2,6-dihalopyridines, as above set forth. In such cases, where the pyridine ring contains no carboxyl substituent, hydrolysis of the 2,6-dihalopyridines per se is unnecessary. Nevertheless, it is preferred to treat the reaction mass with water as a convenient means to separate the desired 2,6-dihalopyridine products from the other products in the reaction mixture which are readily hydrolyzed.

The invention is further illustrated by the following examples.

Example I

Four hundred and eighty-eight gms. of citrazinic acid were dissolved in 1500 gms. of phosphorus oxychloride to form a yellow suspension. This mixture was refluxed in a 3 liter flask for about 4½ hours at a temperature maintained between 90° and 108° C. Upon the first application of heat, the mixture became taffy colored, and later formed a dark brown solution. Hydrogen chloride gas was evolved shortly after the temperature reached 90° C., and continued to be evolved for a period of about 3 hours. This gas was continuously removed from the system until about 3 mols of hydrogen chloride per mol of citrazinic acid had been evolved, as indicated by titration of the effluent gases with aqueous sodium hydroxide solution.

After the major amount of hydrogen chloride gas had been removed from the refluxing mixture, the mixture was transferred to a silver-lined bomb heated to 220° C., at which temperature the mixture was maintained for about 2¾ hours. The pressure in the bomb initially rose to 100 pounds per square inch, but dropped to 75 pounds per square inch after 10 minutes at the stated temperature, dropping further, below 40 pounds per square inch in the next hour. Thereafter, the bomb was cooled to about 22° C., opened and found to contain a mixture of solid and liquid products.

The liquid product was poured into 2 liters of warm water, whereupon a vigorous reaction with the water was observed. A brown precipitate of crystalline 2,6-dichloropyridine-4-carboxylic acid was filtered off, after cooling the aqueous mixture to about 10° C. This was washed with water, and dried to give 185 gms. of product having a melting point of 204° to 205° C. The solid product in the bomb was similarly treated with 2 liters of warm water, whereupon a violent reaction of the product with the water was observed. Upon cooling, filtering, washing and drying as above, 303 gms. of a yellow solid having a melting point of 205° to 206.4° C., were obtained. The total amount of 2,6-dichloropyridine-4-carboxylic acid obtained was 488 gms., corresponding to an overall yield of 81 percent.

Example II

Three hundred gms. of citrazinic acid were suspended in 900 gms. of phosphorus oxychloride and refluxed, as in Example I, for a period of about 2½ hours. After 1 hour, most of the citrazinic acid had become dissolved, and during the entire reflux period, about 2 mols of hydrogen chloride gas were evolved per mol of citrazinic acid, as indicated by titration with aqueous sodium hydroxide solution. Thereafter, the reflux mixture was cooled and transferred to a silver-lined bomb which was sealed and heated to a temperature of 200° C. for about 3 hours. The initial pressure was observed to be 150 pounds per square inch, and by the end of the 3 hour period the pressure dropped to about 100 pounds per square inch. After further treating the reaction mixture as in Example I, 309 gms. of a light colored product having a melting point of 210° C. to 211° C. were obtained, corresponding to a yield of 83.3 percent.

From the foregoing, it can readily be seen that this invention provides a more economical and efficient process for halogenating 2,6-dihydroxypyridine compounds. Thus, such compounds can be prepared in accordance with the present invention in ordinary acid resistant equipment, such as an ordinary glass-lined autoclave rated at 200 pounds per square inch, without the need for specially designed equipment which would be required if prior art methods of synthesis were employed. The products obtained are useful as intermediates in organic syntheses, 2,6-dichloropyridine-4-carboxylic acid being particularly useful in the preparation of isonicotinic acid. Isonicotinic acid, in turn, can readily be converted to isonicotinic acid hydrazide, which has shown utility in the treatment of tuberculosis.

Resort may be had to such modifications and equivalents as fall within the spirit of the invention and the scope of the appended claims.

We claim:

1. A process for halogenating a 2,6-dihydroxypyridine-4-carboxylic acid in the 2,6 positions, which comprises preheating a mixture of citrazinic acid and a halogenating agent selected from the group consisting of phosphorus oxychloride and phosphorus oxybromide, at a temperature from about 80° C. to the boiling point of the mixture, simultaneously withdrawing from the system a major amount of the hydrogen halide gas liberated thereby, and thereafter heating the mixture in a sealed vessel at a temperature between about 180° and 230° C. and under autogenously produced superatmospheric pressure to complete the 2,6 halogenation.

2. A process for preparing 2,6-dichloropyridine-4-carboxylic acid which comprises refluxing a mixture of citrazinic acid and phosphorus oxychloride, simultaneously withdrawing from the system a major amount of the hydrogen chloride gas liberated thereby, thereafter heating the mixture in a sealed vessel at a temperature between about 180° and 230° C. and under autogenously produced superatmospheric pressure to complete the halogenation, and recovering 2,6-dichloropyridine-4-carboxylic acid from the products so produced.

3. A process for preparing 2,6-dichloropyridine-4-carboxylic acid which comprises refluxing a mixture of citrazinic acid and phosphorus oxychloride at about atmospheric pressure for a period sufficient to liberate about 2 to 3 mols of hydrogen chloride gas per mol of citrazinic acid, simultaneously withdrawing said gas from the system, thereafter heating the mixture in a sealed vessel under autogenously produced superatmospheric pressure and at a temperature from about 180° to 230° C. to complete the halogenation, and recovering 2,6-dichloropyridine-4-carboxylic acid from the products so produced.

4. The process of claim 3 wherein the 2,6-dichloropyridine-4-carboxylic acid is recovered by hydrolysis of 2,6-dichloropyridine-4-carboxylic acid chloride to the carboxylic acid.

References Cited in the file of this patent

Behrmann et al.: Berichte, vol. 17, pp. 2694–96 (1884).
Bittner: Berichte, vol. 35, p. 2933 (1902).
Sell: J. Chem. Soc. (London), vol. 71, pp. 1068–73 (1897).
Meyler et al.: Monatshefte fur Chemie, vol. 36, pp. 734–5 (1915).
Maier-Bode: "Pyridin und seine Derivate," p. 262 (1934).
Lovelt et al.: "Chem. Abst." (1929), vol. 23, p. 2976.
Meyer et al.: "Chem. Abst." (1916), vol. 10, p. 180.